T. J. MARKERT.
DIRECTION SIGNAL FOR MOTOR VEHICLES.
APPLICATION FILED SEPT. 2, 1919.
1,361,270. Patented Dec. 7, 1920.
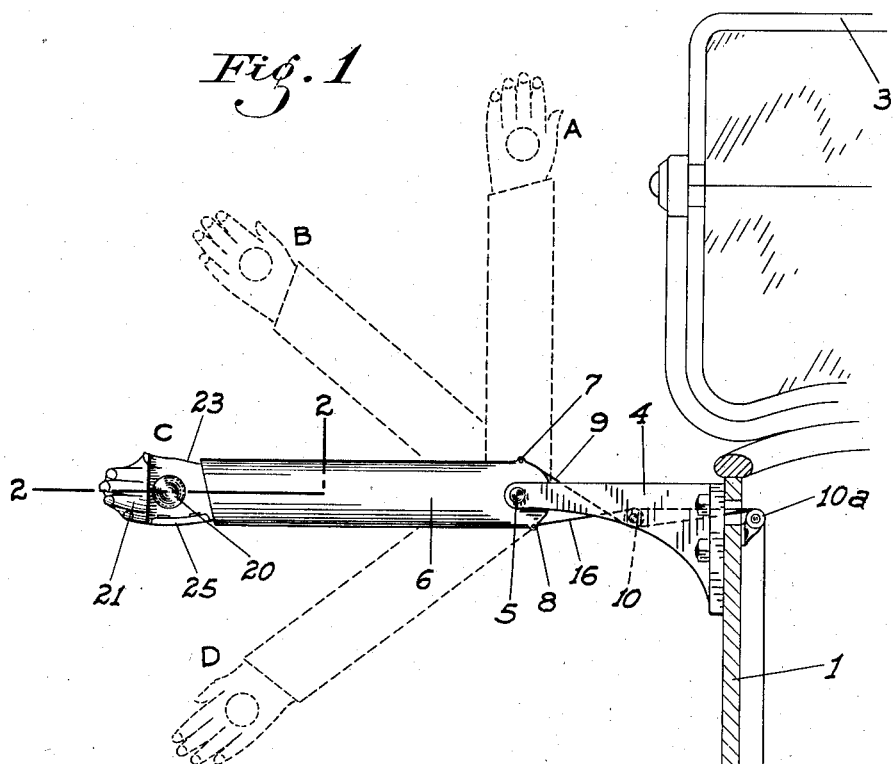
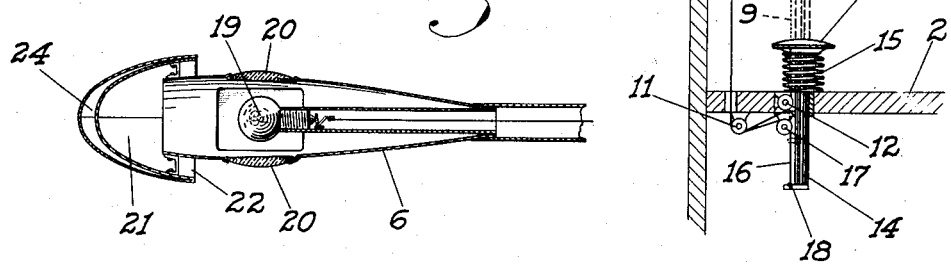
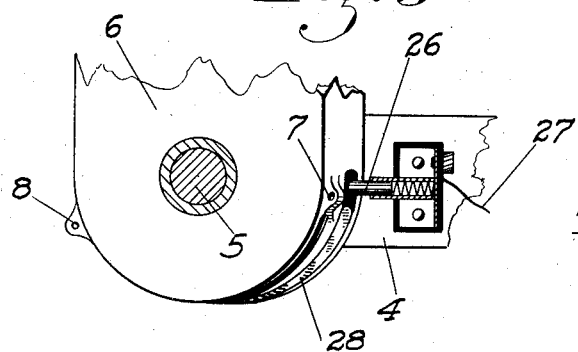
INVENTOR.
Theodore J. Markert
BY
ATTORNEY

UNITED STATES PATENT OFFICE.

THEODORE J. MARKERT, OF STOCKTON, CALIFORNIA.

DIRECTION-SIGNAL FOR MOTOR-VEHICLES.

1,361,270.  Specification of Letters Patent.  Patented Dec. 7, 1920.

Application filed September 2, 1919. Serial No. 320,990.

*To all whom it my concern:*

Be it known that I, THEODORE J. MARKERT, a citizen of the United States, residing at Stockton, in the county of San Joaquin, State of California, have invented certain new and useful Improvements in Direction-Signals for Motor-Vehicles; and I do declare the following to be a full, clear, and exact description of the same, reference being had to the accompanying drawings, and to the characters of reference marked thereon, which form a part of this application.

This invention relates to improvements in direction signal devices for automobiles, the principal object of the invention being to produce a device intended to be used in place of the human arm for indicating an intention to stop or turn on the part of the driver of the car, and which will be as easily visible by night as by day.

Another object is to provide such a signal arm with a means for operating the same by the foot of the driver, so that his hands are free for the proper manipulation of the steering wheel, etc.

A device of this character should prove to be of great service, especially at night, with inclosed cars, and in winter with all cars.

When running at night, under the present system of merely extending the hand when a turn or stop is to be made, it very frequently happens that a car behind will fail to see the extended hand of the driver of the car ahead, and collisions result.

The fear of the possibility of such an occurrence is with every careful driver to a certain extent, and hence he is under a nervous strain when driving.

In the case of winter driving, the windows or side curtains are usually drawn, and the driver is either unable to extend his hand or to do so, must lower the window or unfasten the curtains, letting in the wintry elements.

Another object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1 is a fragmentary cross section of a motor vehicle, showing my improved signal device installed thereon, the dotted positions of the arm each indicating a different signal meaning.

Fig. 2 is a fragmentary sectional plan of the arm taken on a line 2—2 of Fig. 1.

Fig. 3 is an enlarged detached view of the pivoted end of the arm.

Referring now more particularly to the characters of reference on the drawings, the numeral 1 denotes the body of the vehicle at the front or driver's compartment, 2 the floor and 3 the usual windshield.

Mounted to the body 1 adjacent the windshield is a forked bracket 4 projecting outwardly at right angles to the body, in the outer end of which bracket is pivoted as by a pin or shaft 5, a hollow signal arm 6, substantially vertically oval in cross section.

Opposed lugs 7 and 8 project from the pivoted end of the arm.

From the inner or upper lug 7, a cable 9 leads under a pulley 10 mounted in the bracket and thence over a pulley 10ª mounted to the body 1, under pulleys 11 and 12 mounted to the floor 2 to the under side of a foot pedal 13 mounted on a vertical rod 14 movable through the floor 2 in a vertical plane. A spring 15 is positioned on the rod 14 between the pedal 13 and the floor, and normally exerts its pressure to hold the pedal in its uppermost position.

A similar cable 16 extends from the under or outer lug 8 on the arm 6, over pulleys 10, and 10ª, under pulley 11, and over a pulley 17 also mounted to the floor below the pulley 12, to a connection at the lower end of the rod 14, as indicated at 18.

By this arrangement of the cables and pulleys, the normal or at rest position of the arm being the vertical dotted position "A" and the pedal 13—14 being then at its uppermost position, a downward movement of the pedal will cause the cable 16 to move downward also, which will pull the arm 6 to any one of the positions "B," "C" and "D," depending on the distance the pedal is pressed down.

The arm is of course held from dropping of its own weight by reason of the opposed cable 9, whose slack is governed by the movement of the pedal 13. When the pressure on the same is removed, the spring 15 acts to raise it, thus exerting a positive pull on the cable 9, and raising the arm 6 to its normal at rest position.

In order that the arm 6 may be easily visible at night, I provide an electric lamp 19 in the outer end of the arm, adapted to shine to the front and rear of the vehicle through red colored lenses 20 mounted in the arm.

The outer end of the arm is open and a reflector 21 is secured over this end, there being a space between the sides of the arm and the reflector as at 22 so that the light from the lamp may be thrown back over the full length of the arm on both sides.

Inasmuch as the outer end of the arm is painted or pressed out to represent a human hand, as at 23, the reflector member 21, on which the hand is represented, would preferably be double, as shown at 24, so that the outer shell could be molded more or less to the shape of the hand, while the inner shell would have a true parabolic or other form or curvature suitable for a reflector.

The bottom of the hand portion is provided with a door 25, so that the fingers may be inserted to remove or install a lamp.

The lamp will not be lighted until the arm is moved away from its normal vertical position. There are various methods for automatically closing a circuit, such as for instance a spring pressed contact pin 26 mounted to the bracket and connected with one of the circuit wires 27, and adapted to contact with an insulated strip 28 secured to the arm only when such arm is moved downwardly, the strip of course being suitably connected to one terminal of the lamp 19.

The positions "B," "C" and "D" of the arm are signal positions indicating a turn to the left, one to the right, and an intention to stop, respectively.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a signal arm for motor vehicles, a lamp in the outer end of the arm and adapted to show on both sides thereof, and a vertical reflector positioned beyond the plane of the sides of the arm, whereby the light from the lamp will be thrown the full length of the arm on both sides thereof to illuminate the same at night.

2. A direction signal arm for motor vehicles comprising a rigid body of a shape and size to represent the human arm and adapted to be projected from the side of the vehicle at will, a lamp in the outer end of the arm, and means whereby the direct rays from the lamp will show as a spot of light of a distinct warning color from the front and rear, while the indirect rays of the lamp will be thrown back over the entire surface of the arm.

3. A direction signal comprising an elongated arm portion adapted to be moved to project from the side of the vehicle at will, a lamp mounted in the outer end of the arm, the same being hollow, and provided with orifices on both sides to allow the direct rays from the lamp to be seen from front and rear, a hollow member on the outer end of the arm and extending therebeyond, and on both sides of the arm being shaped to represent a human hand, and a reflector in said hand portion and facing the lamp and also extending beyond the sides of the arm, the outer end of said arm being open whereby the rays of light from the lamp will strike the reflector and be thrown the full length of the arm.

In testimony whereof I affix my signature in presence of two witnesses.

THEODORE J. MARKERT.

Witnesses:
BERNARD PRIVAT,
FRANK H. CARTER.